ELECTRONIC IMAGE-PRODUCING APPARATUS

Filed June 1, 1967 5 Sheets-Sheet 1

INVENTOR.
Warner H. Witmer
BY Thomas M. Ferrill, Jr.
ATTORNEYS

INVENTOR.
Warner H. Witmer
BY Thomas M. Ferrill Jr.
ATTORNEYS

INVENTOR.
Warner H. Witmer
BY Thomas M. Ferrill, Jr.
ATTORNEYS

Oct. 6, 1970 W. H. WITMER 3,532,809

ELECTRONIC IMAGE-PRODUCING APPARATUS

Filed June 1, 1967 5 Sheets-Sheet 4

INVENTOR.
Warner H. Witmer
BY Thomas M. Ferrill Jr.
ATTORNEYS

INVENTOR.
Warner H. Witmer
BY Thomas M. Ferrill, Jr.
ATTORNEYS

United States Patent Office 3,532,809
Patented Oct. 6, 1970

3,532,809
ELECTRONIC IMAGE-PRODUCING APPARATUS
Warner H. Witmer, Flemington, N.J.
(146 S. 3rd St., Quakertown, Pa. 18951)
Filed June 1, 1967, Ser. No. 642,811
Int. Cl. H04n 5/70
U.S. Cl. 178—7.3 11 Claims

ABSTRACT OF THE DISCLOSURE

Electrical signal responsive apparatus for the production of images in a picture area is constructed as a compact sandwich including, in its forward portion, a photoconductive-electroluminescent light amplifier as its controllable light-producing system and in rearward part of the sandwich a gaseous-discharge stepping tube array wherein a glow discharge for excitation of the photoconductive layer is caused to progress recurrently through a predetermined raster. The stepping tube arrangement is relied upon to effectuate the necessary scanning of the activated spot in the photoconductive layer and the adjacent spot excitation of the electroluminescent layer. Video signal modulation is applied to electrodes between which are included the photoconductive layer and the electroluminescent layer, to provide variable intensity luminescence of the electroluminescent layer in the elemental position where the photoconductive layer is momentarily rendered most conductive by the scanning electron discharge means.

BACKGROUND OF THE INVENTION

The present invention relates to electric signal responsive apparatus for production of images. It is concerned primarily with improved apparatus for electrically scanning a predetermined area and presenting pictures or other data representations within such an area. One example of the use of the present invention is for the reproduction of television pictures, for example, in a closed circuit or industrial television system application.

Cathode ray television picture presentation systems as presently used are capable of producing images in various sizes up to and including approximately 15″ x 20″, and in some instances even larger. One disadvantage of the present television reproducers of small, medium and large screen sizes is the great bulk and rearward extension of the cathode ray picture tubes.

An object of the present invention is to provide an extremely compact image reproduction system.

Another object is to provide an image reproduction system whose depth from front to rear is very small compared to the width and height of the picture area.

Another object is to provide a scanning type reproduction system wherein the scanning is precisely controlled as to its height, width and linearity, each scanning line being controlled as to position, linearity and scan timing.

Other and further objects will appear from the following description of an embodiment of the invention.

In accordance with the present invention, an image reproduction system is constructed as a compact sandwich including, in its forward portion, a photoconductive-electroluminescent light amplifier as its controllable light-producing system, the rearward part of the sandwich comprising a gaseous-discharge stepping tube array wherein a glow discharge for excitation of the photoconductive layer is caused to progress recurrently through a predetermined raster. The stepping tube arrangement is relied upon to effectuate the necessary scanning of the activated spot in the photoconductive layer and the adjacent spot excitation of the electroluminescent layer. Video signal modulation is applied to electrodes between which are included the photoconductive layer and the electroluminescent layer, to provide variable intensity luminescence of the electroluminescent layer in the elemental position where the photoconductive layer is momentarily rendered most conductive by the scanning electron discharge means.

The above objects and brief description will be better understood by reference to the following detailed description, considered along with the drawings, wherein.

Figure 1:
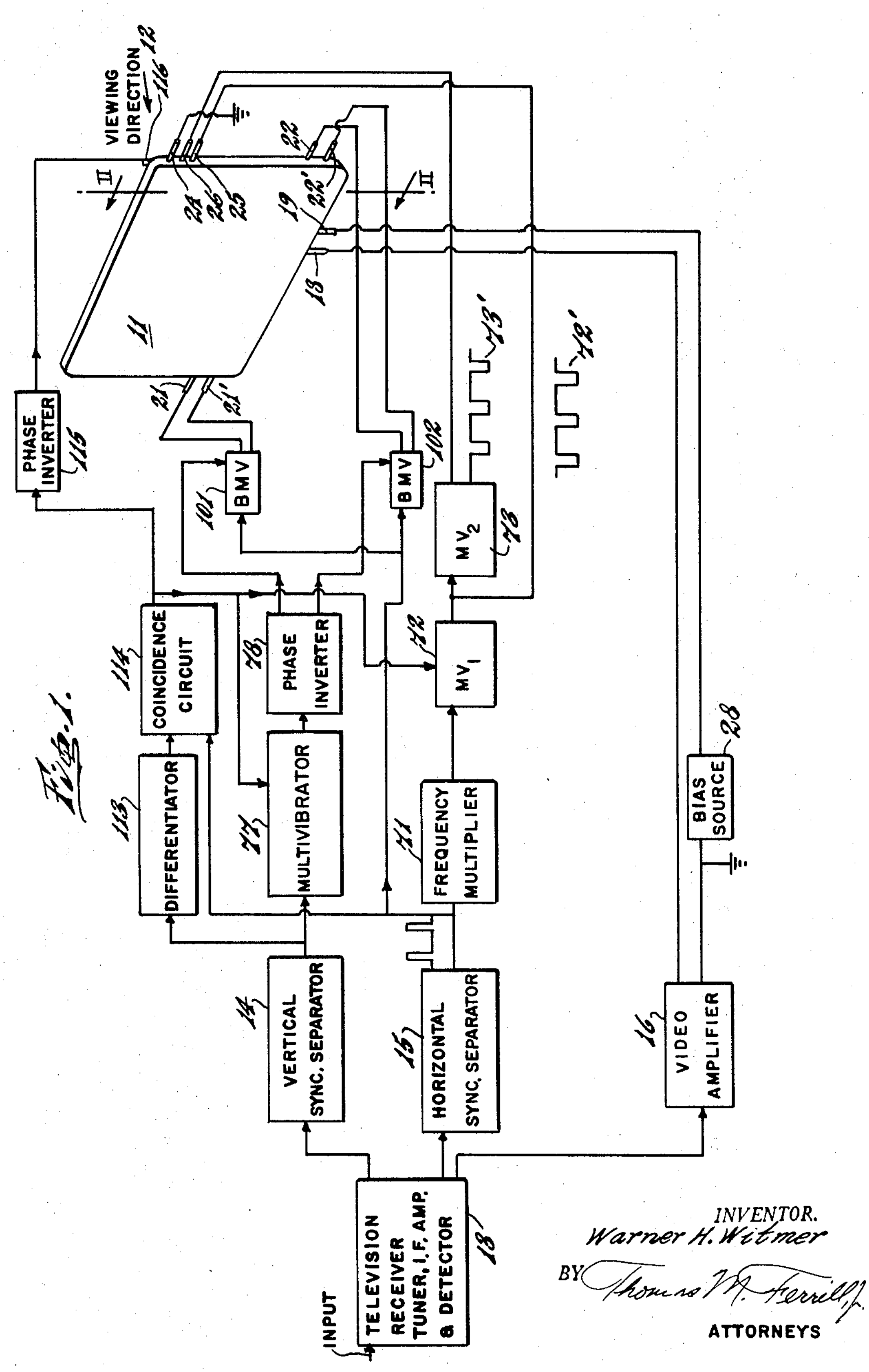
FIG. 1 is a schematic diagram of the present invention applied to a television receiver.

Referring now to FIG. 1, an image reproducer 11 in accordance with the present invention is arranged to produce images to be viewed from the viewing direction 12. One of the uses to which such a viewing arrangement can be put is the reproduction of television images received by a television receiving apparatus. The television receiver apparatus in FIG. 1 includes a tuner-IF amplifier-detector system 13, a vertical synchronization separator 14, a horizontal synchronization separator 15, and a video amplifier 16.

The image reproducer 11 is provided with video input terminals 18 and 19, line interlace control terminals 21, 21′, 22 and 22′, and line scanning control terminals 24, 25 and 26. The terminals 18 and 19 preferably are provided with a bias potential from a bias source 28, in addition to video output voltage from video amplifier 16.

Figure 2:
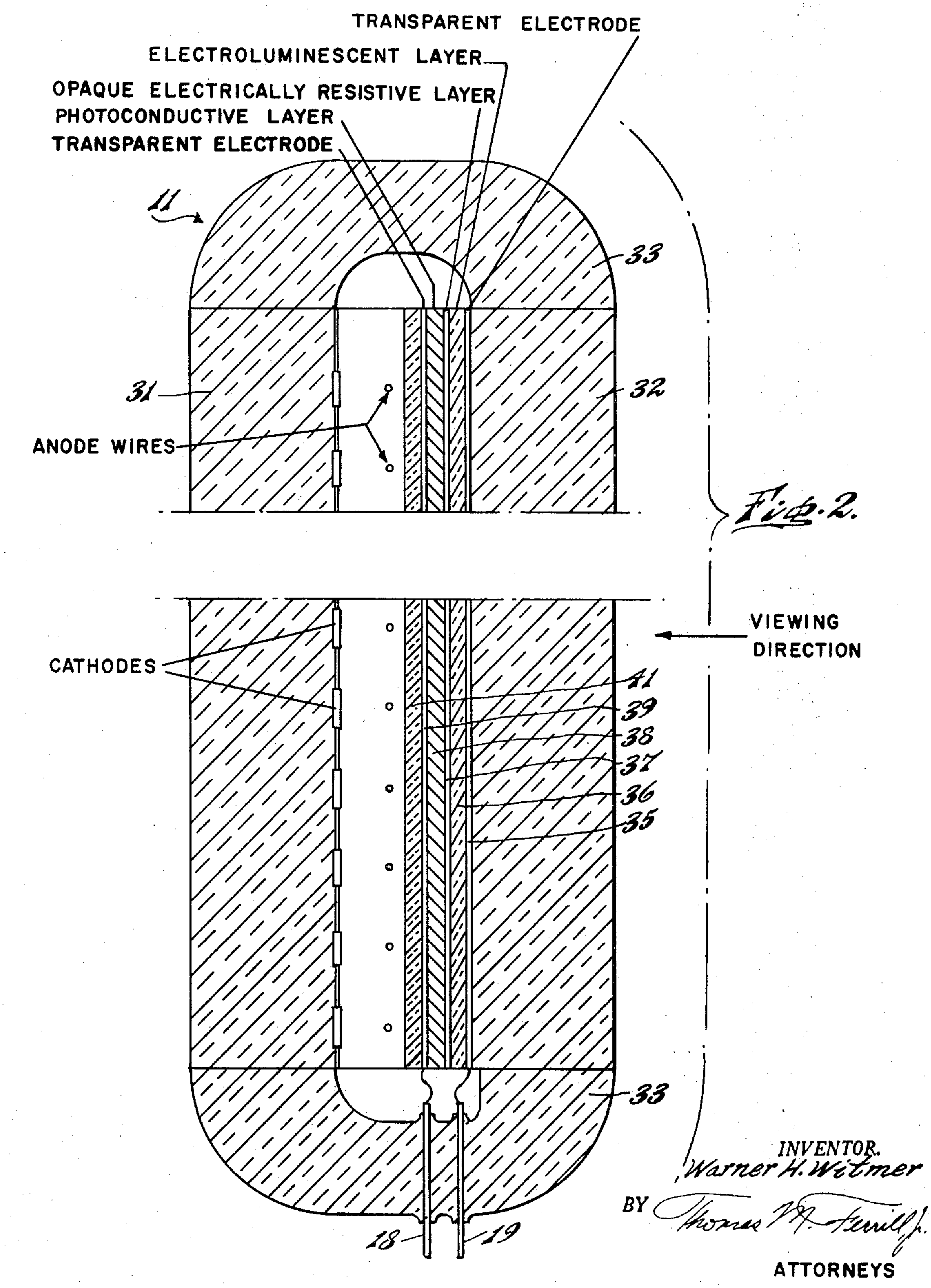
FIG. 2 is a cross-sectional diagram of the picture presentation apparatus or image reproducer in FIG. 1, taken in a vertical plane.
Figure 3:
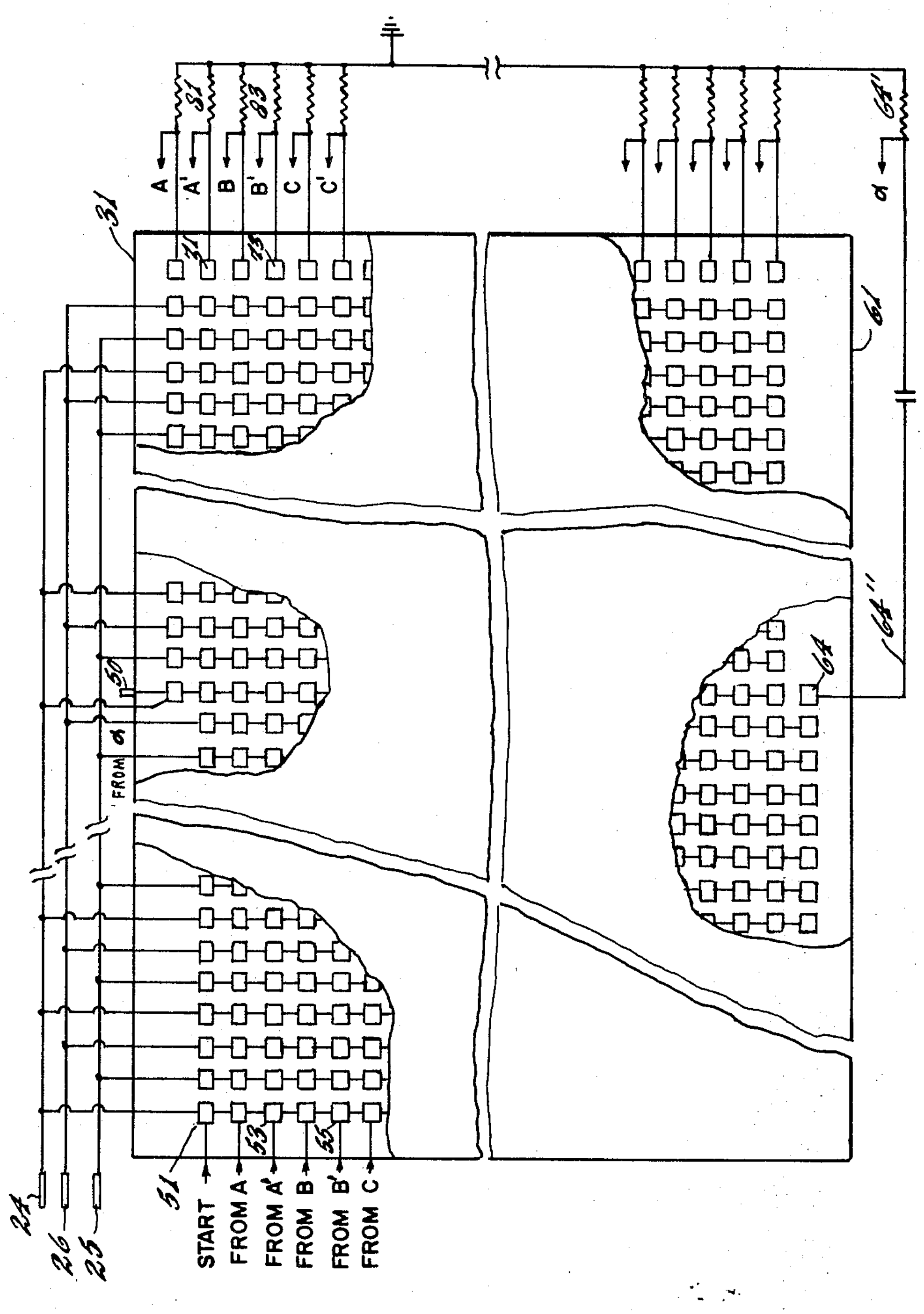
FIG. 3 is a diagrammatic illustration of the mosaic of cathode elements included in the image reproducer of FIG. 2.
Figure 4:
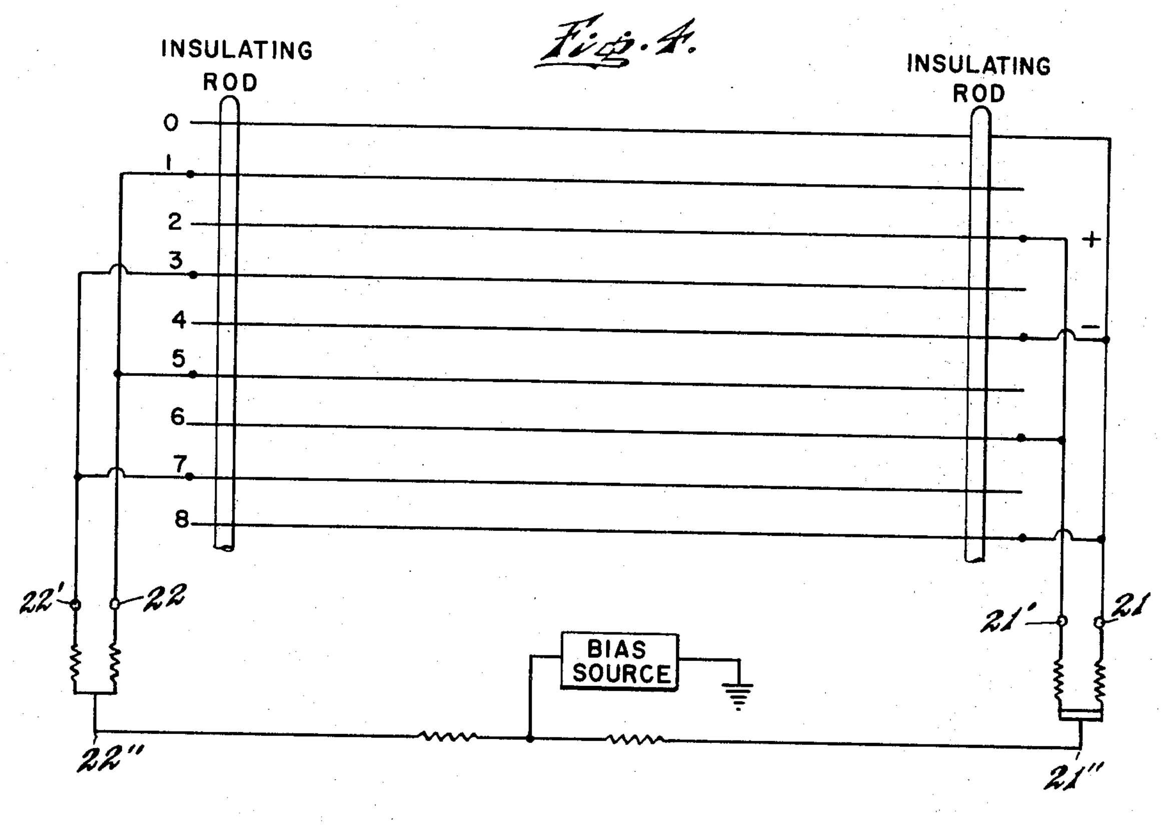
FIG. 4 is a diagram of the anode grids of the image reproducer of FIG. 2.

Referring now to FIGS. 2, 3 and 4, the image reproducer 11 preferably comprises a vitreously sealed envelope including a rear panel 31, a viewing panel 32 such as a panel of glass, and sealing means 33 joined to the front and rear panels 31 and 32 and forming a closure therebetween extending throughout the periphery of the image reproducer 11.

Proceeding rearwardly from the transparent front panel or face plate 32, the device 11 includes an extremely thin electrode 35 which may be a transparent aluminum layer less than 100 angstroms thick, for example, an electroluminescent layer 36, an opaque moderately resistive layer 37, a photoconductive layer 38, another substantially transparent metal electrode 39, and a transparent insulating layer such as a thin layer of glass 41 applied to the rear surface of conductive layer 39.

To the rear of the glass layer 41 are four interleaved anode grids of conductive material such as wires of the order of 2 mils diameter. Wires of these two grids are seen in cross-section in the fragmentary upper and lower portions of the image reproducer as seen in FIG. 2, and are diagrammed in FIG. 4. Spaced to the rear of these interleaved anode grids is a mosaic of cathode elements. FIG. 3 is a diagram showing the general arrangement of the cathodes. Included are a top half-line of cathodes, a first full line commencing with cathode 51 and extending from left to right across the array, 509 further full lines of cathodes, and a bottom half-line of cathodes.

Referring now to FIG. 3, the mosaic of cathodes is fixed to the front surface of rear plate 31. As indicated in FIG. 3, the cathodes of the second vertical row are interconnected and are connected to terminal 25. The same is true of the fifth vertical row, the eighth vertical row, and the additional vertical rows at intervals of three across the device 11. The cathodes of the third, sixth and ninth vertical rows and the further rows at intervals of three are interconnected and are connected to terminal 26. Except for the right bottom and right vertical row, the remaining cathodes of the mosaic are interconnected and are connected to terminal 24. Scanning of the electron discharge is required to commence at cathode 51 at the upper left corner of the mosaic, and proceed along the first full line (a substantially horizontal line) of cathodes to the upper right corner of the mosaic, i.e., to cathode 71. The glow discharge must then be transferred from the right-hand end of the first full line of cathodes to the left-hand end of the third full line of cathodes, i.e. to cathode 53. The electron discharge is then required to progress at the predetermined rate from the extreme left-hand cathode 53 to the extreme right-hand cathode 73 in the third full line, and to be transferred from that point immediately to the extreme left-hand cathode 55 in the fifth full line, and so on.

Upon progression of the electron discharge along the bottom half-line of cathodes to cathode 64, transfer is required to be made to the top of the device. Progression of the electron discharge must then occur similarly through the top half-line of cathodes and the even-numbered full lines of cathodes, concluding with the arrival of the electron discharge at the extreme right-hand cathode of the last full line of cathodes, from which a transfer is effectuated to the starting cathode 51 at the upper left corner of the mosaic.

In order to control the downward progression of the glow discharge, the horizontal anode conductors spaced from the mosaic of cathodes comprise four sets of interconnected wires, for example, as shown in FIG. 4. The wires numbered 0, 4, 8 and every fourth wire below are connected to terminal 21, and the wires numbered 2, 6 and every fourth wire below are connected to terminal 21′. Similarly, at the left end of the set the wires numbered 1, 5 and every fourth wire below are connected to terminal 22 and the remaining wires, numbers 3, 7 and every fourth wire below are connected to terminal 22′.

Referring again to FIG. 1, circuits are provided for establishing an initial glow discharge between starting cathode 51 (FIG. 3) and adjacent wire 1 (FIG. 4) through the low-pressure gaseous medium contained in the device 11, and for causing progression of the glow discharge from left to right along the cathodes adjacent wire 1 to the right side of the device 11, transfer thence to cathode 53 at the left end of anode wire 3, progression to the right along the cathodes adjacent wire 3, and so forth. These circuits includes a multivibrator 77 responsive to the output of the vertical sync separator 14, shown at A in FIG. 5, and a phase inverter 78, coupled to multivibrator 77, for producing the waves F and F′ in FIG. 5. The oppositely phased square waves at field frequency provided at the output of phase inverter 78 are applied to terminals 21″ and 22″ (FIG. 4), so as to maintain the odd-numbered wires substantially more positive in potential than the even-numbered anode wires throughout one field (i.e. through one vertical scan), and to maintain the reverse polarity difference during the next field, etc.

Figure 5:
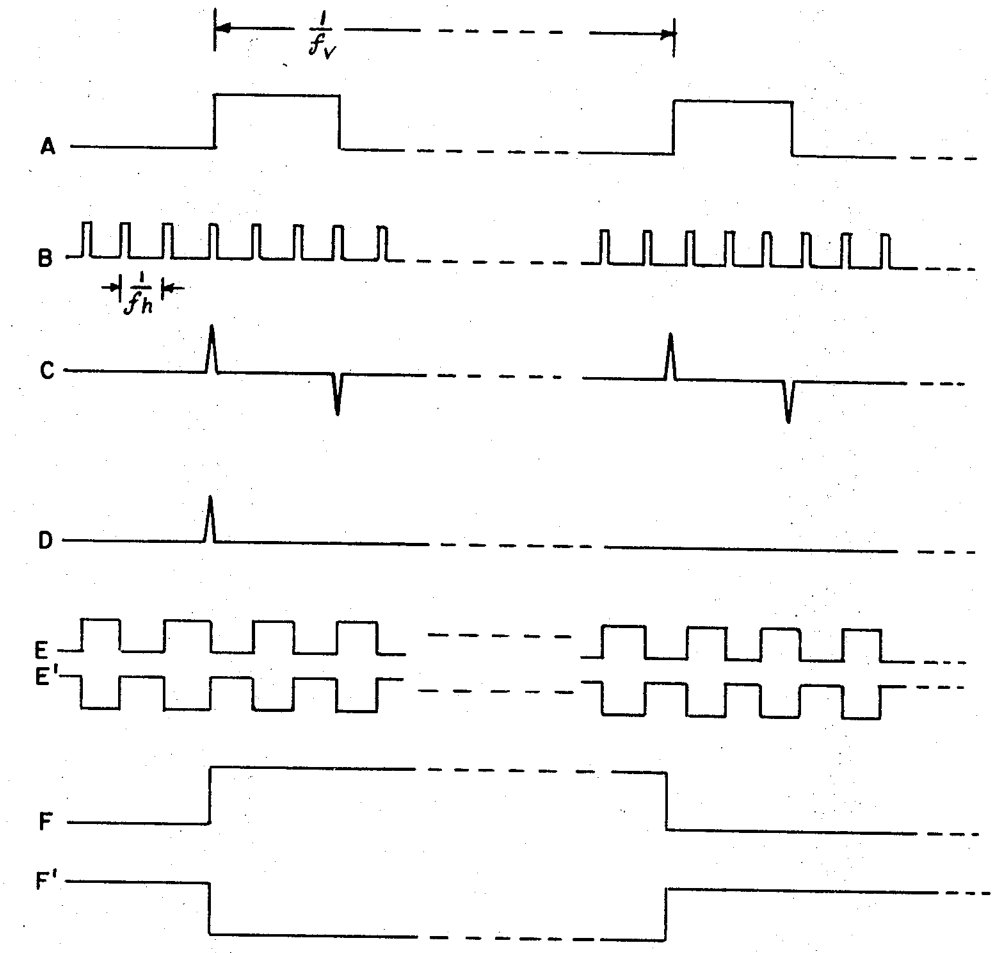
FIG. 5 is a graph of voltage waves occurring in the apparatus of FIG. 1.

Bistable multivibrators 101 and 102 are provided for generating the square wave voltages shown at E and E′ in FIG. 5, at one-half line frequency. For the duration of the first scan line, bistable multivibrator 102 maintains terminal 22 and the anode wires connected thereto (FIG. 4) positive relative to terminal 22′ and the anode wires connected thereto. The starting phases for the system are initiated by a coincidence circuit 114 which is jointly responsive to the output of vertical sync pulse differentiator 113 (see wave C in FIG. 5) and the sync pulses at the output of horizontal sync separator 15 (see wave B in FIG. 5). The resultant output from coincidence circuit 114 is one pulse per frame of two fields, since, as in conventional line-interlaced television scan rasters, the differentiated leading edges of alternate ones of the vertical sync pulses are non-coincident with horizontal sync pulses.

The pulse D produced by coincidence circuit 114 signals the beginning of a complete scan frame. It initiates application of the positive potential to terminal 22″ (FIG. 4) relative to terminal 21″, in accordance with wave F in FIG. 5, and causes bistable multivibrator 102 to be triggered to commence in such phase that terminal 22 is at maximum positive potential while terminal 22′ is at a much lower potential. As a result, for the duration of the first half cycle of the outputs of the bistable multivibrators 101 and 102 (waves E and E′ in FIG. 5), the anode wires 1 and 5 and every fourth wire below are maintained at a suitable positive potential for supporting a glow discharge while all the other anode wires are of too low potential for glow discharge.

The frame initiation pulse from the coincidence circuit 114 is also applied to a phase inverter 115 whose output is coupled to terminal 116 of the device 11, and thereby connected to a trigger probe adjacent cathode 51. The negative pulse thus applied establishes the initial glow discharge between cathode 51 and anode wire number 1.

The output of horizontal sync separator 15 is supplied to the input circuit of a frequency multiplier 71 which may comprise cascade stages providing multiplication by factors 4, 6 and 7, for example, the product of which is 168. Multiplier 71 receives pulses at horizontal line frequency $f$ and produces output pulses at frequency $168f$. These pulses are fed into multivibrator 72, and a further multivibrator 73 is arranged to be triggered by the trailing edges of the pulses from multivibrator 72. The multivibrators 72 and 73 each produce rectangular output pulses of frequency $168f$ and of approximately 120° duration.

The outputs of multivibrators 72 and 73 are connected to terminals 25 and 26 of the device 11 (FIGS. 1 and 3). The first negative pulse from multivibrator 72 makes the second vertical row of cathodes substantially more negative than the first and third rows, and attracts the glow discharge existing between cathode 51 and anode wire number 1. As a result, the glow discharge is caused to transfer to the adjacent cathode in the second vertical row which, like the first cathode 51, is adjacent to the number 1 anode wire. In turn, the ensuing negative pulse from multivibrator 73 causes the glow discharge to be attracted to the top cathode of the third vertical row. Upon cessation of that pulse, the glow discharge is yet further transferred to the top cathode of the fourth vertical row, since terminal 24 is maintained at sufficient negative potential to support the glow discharge at any cathode connected thereto and maintain it stationary awaiting a negative pulse from multivibrator 72. In this manner, the glow discharge is caused to proceed along a series of three cathodes for every cycle of the output of frequency multiplier 71.

One full line of cathodes may comprise 504 such elements. The extreme right-hand cathodes are each connected through a resistor to ground. In addition, a conductive path from each of the final cathodes in the direction of progression to the right extends to an auxiliary anode probe or trigger probe in the vicinity of the starting (left-hand) cathode for the next line to be scanned. Thus, cathode 71 at the right-hand end of the uppermost full horizontal line of cathodes, which is connected to a resistor having its opposite end grounded, is connected to the trigger probe extending adjacent to cathode 53. Upon a glow discharge progressing along the first (top) full line of cathodes and reaching cathode 71, the potential drop across the resistor connected thereto causes a rise in potential of the trigger probe adjacent cathode 53. Upon the commencement of the next half-cycle of wave E (FIG. 5), anode wires numbers 3 and 7 and every fourth wire below are raised to the potential for cooperating with the cathode array to sustain glow discharge, and the wires numbers 1, 5 and every fourth wire therebelow are so reduced in potential as to render them unable to participate in glow discharges. Upon this condition being provided, the glow discharge is enabled to progress along the cathodes adjacent anode wire number 3 (FIG. 4).

In like manner, the glow discharge is caused to progress to the right, its timing being regulated by the transmitter-synchronized timing of the horizontal sync pulses, and is again caused to be transferred from cathode 73 to the initial cathode 55 of the fifth full line of cathodes, etc.

Upon the glow discharge eventually reaching cathode 64, connected to resistor 64', the conductor extending from said cathode leads to a trigger probe for initiating glow discharge at cathode 50 in the top half-line of cathodes, adjacent anode wire number 0. The even-numbered cathode lines adjacent the even-numbered anode wires are then traversed for the second field of the scan raster, coincident with the negative half-cycle of the wave at F in FIG. 5 during which the even-numbered anode wires are at higher potential than the odd-numbered anode wires.

The physical arrangement of the interconnections between the probes adjacent the right-hand cathodes and the transfer probes adjacent the left-hand cathodes to which the respective transfers are to be made is not shown. If desired, these paths may be provided on printed circuit layers which may be formed as part of the rear wall 31 of the envelope, for example.

Preferably, the output potential waves 72' and 73' from multivibrators 72 and 73 represent a change of potential from a substantially positive potential to a substantially negative potential during each pulse.

The space between the very thin glass or quartz layer 41 (which may be vapor deposited quartz, for example) and the back plate 31 of the envelope is filled with low pressure gas which preferably is selected for rapidity of initiation and extinction of glow discharge between a given pair of conductive elements. Such a gas, for example, may consist chiefly of hydrogen with a trace of krypton, maintained at a relatively low pressure. In this gaseous medium, the aforementioned glow discharges are generated.

During the momentary existence of a glow discharge between one of the cathodes of the mosaic and the anode grid wire adjacent thereto, the immediately adjacent elemental area of photo conductive layer 38 is illuminated through the very thin light-transmitting layers 41 and 39. As a result, the resistivity of the photoconductive layer 38 momentarily is sharply reduced in this elemental area, in contrast to its relatively high resistivity between its parallel planar surfaces everywhere else but immediately adjacent the glow discharge. As a result, an electric current of intensity dependent upon the video potential difference momentarily impressed between the video input terminals 18 and 19 and electrodes 39 and 35 is caused to flow in the very localized region of the electroluminescent layer immediately in front of the momentary location of the glow discharge. Hence, that adjacent elemental area of the electroluminescent layer is caused to generate a light output of intensity directly dependently upon the potential difference momentarily existing between the video input terminals. While the same potential difference is applied over the entire surfaces of the substantially transparent conductive layers 35 and 39, the resulting current therebetween for energizing the electroluminescent layer at the given moment is substantially concentrated in the extremely small area of the photoconductive layer which is rendered substantially conductive by the glow discharge immediately to its rear.

The opaque high-resistivity layer 37 between the photoconductive layer 38 and the electroluminescent layer 38 serves as a barrier to prevent the light generated in the electroluminescent layer from feeding back to tend to sustain a condition of high conductivity of the photoconductive layer 38. This obaque layer is so thin as not to impede substantially the energizing current to the adjacent elemental area of the electroluminescent layer, but is of sufficient resistivity to not distribute the energizing current over an appreciably broadened elemental area of the electroluminescent layer.

In system applications of the apparatus described herein, the speed of transfer of the electric glow discharge from cathode to cathode along a given scan line must be taken into account in determining the maximum value of the line scanning frequency $f$. If a 525-line scan picture is desired, with the number of elements in each horizontal line corresponding to a switching frequency of $168f$, as mentioned in the foregoing example, then it is necessary for $f$ to be such a frequency that $1/504f$ shall be no shorter than the minimum time for the glow transfer from one cathode to the next cathode.

While the present invention has been described as applied to the reproduction of television images, with horizontal-line-interlace, this is only one illustration of the uses which may be made. The image presentation apparatus may be used for presentation of images corresponding to radar signals, images denoting computer output data, or graphic images such as line or dot drawings, single or multiple plots of voltages or currents or other values as functions of time, correlated graphs of one electric value as a function of a second electric value with specific discrete values of a third variable, such as families of graphs representing vacuum tube or transistor characteristics, and many other uses.

While a photoconductive layer 38 is shown in the drawings and described herein, that layer may be omitted if desired. If the photoconductive layer and the opaque separator layer 37 are omitted, the apparatus tends to provide higher frequency response with somewhat lower light sensitivity. This illustrates one of the alternatives as to the form of the light amplifier usable with the glow discharge scanning means.

In view of the fact that the scanning in the present invention is much more precisely controlled as to time and position than in conventional tubes, the present invention is especially adaptable to presentation of images in colors. By providing as the elemental areas of the picture screen phosphors in different colors of luminescence, for example red, green and blue, along each scan line in predetermined relation to the positioning of the cathodes along the line, and by modulating the video signal accordingly in timed relation to the scan, color images may be reproduced.

Although specific embodiments of the invention have been shown and described, it will be understood that they are but illustrative and that various modifications may be made therein without departing from the scope and spirit of this invention.

What is claimed is:

1. Electric signal responsive apparatus for production of images in a picture area, comprising, in combination:
   - a layer of electroluminescent material,
   - a layer of photoconductive material adjacent to said layer of electroluminescent material,
   - first and second thin substantially transparent electrodes,
   - said layer of photoconductive material and said layer of electroluminescent material being disposed between and respectively adjacent to said first and second electrodes,
   - means for applying energizing potential between said first and second electrodes,
   - a multiplicity of electron discharge cathodes in a mosaic pattern substantially parallel to and spaced behind said first electrode, means providing a low-pressure gaseous medium extending to said cathodes wherein electric glow discharge may occur, and anode means in said gaseous medium cooperating with said cathodes to establish a localized glow discharge transferable from cathode to cathode in a predetermined raster pattern for activating said photoconductive material in the immediate region of the glow discharge and thereby localizing the electric energization of said electroluminescent layer and the resulting light output therefrom.

2. Electric signal responsive apparatus as defined in claim 1 including an envelope of rigid material enclosing at least said cathodes and said anode means.

3. Electric signal responsive apparatus as defined in claim 2, wherein said envelope includes a transparent front window, said first and second substantially transparent electrodes and the photoconductive and electroluminescent material layers therebetween being enclosed in said envelope, and said second substantially transparent electrode being adjacent said front window.

4. Electric signal responsive apparatus as defined in claim 1, including a thin substantially transparent insulating layer between said first substantially transparent electrode and said anode means, and a thin substantially opaque layer interposed between said photoconductive layer and said electroluminescent layer.

5. Electric signal responsive apparatus as defined in claim 4, wherein said means for applying energizing potential between said first and second electrodes comprises means for applying television video signals therebetween to produce different light intensity values in different elemental areas of the screen, said apparatus further including means for causing the electric glow discharge to proceed throughout a line-by-line scanning raster in synchronism with the supplied television signals, said last named means comprising means for recurrently energizing every third cathode along a substantially horizontal line or row of cathodes in a first phase, and energizing the next adjacent cathodes in the line or row in the desired direction of the progression of the glow discharge in a second phase displaced by a predetermined phase angle from said first phase.

6. Electric signal responsive apparatus as defined in claim 4, wherein said means for applying energizing potential between said first and second electrodes comprises means for applying television video signals therebetween to produce different light values in different elemental areas of the screen, said apparatus further including means for causing the electric glow discharge to proceed throughout a line-by-line scanning raster in synchronism with the supplied television signals, said last-named means comprising a plurality of sets of mutually interconnected cathodes and means for recurrently changing the potential of at least one set of interconnected cathods relative to another set.

7. Electric signal responsive apparatus as defined in claim 1, wherein said anode means comprises first and second conductive anode grids interleaved with and insulated from each other, the conductors of said first grid being adjacent alternate rows of cathodes, and the conductors of said second grid being adjacent the intervening rows of cathodes.

8. Electric signal responsive apparatus as defined in claim 6, wherein said means for applying energizing potential between said first and second electrodes comprises means for applying television video signals therebetween to produce different light intensity values in different elemental areas of the screen, said apparatus further including means for causing the electric glow discharge to proceed throughout a line-by-line scanning raster in synchronism with the supplied television signals, said last named means comprising means for recurrently energizing every third cathode along a substantially horizontal line or row of cathodes in a first phase, and energizing the next adjacent cathodes in the line or row in the desired direction of progression of the glow discharge in a second phase displaced by a predetermined phase angle from said first phase.

9. Electric signal responsive apparatus as defined in claim 7, further including means for applying a substantially higher positive potential to said first conductive anode grid than to said second conductive anode grid during alternating fields of scan, and applying substantially higher positive potential to said second conductive anode grid than to said first conductive anode grid during the intervening fields of scan.

10. Electric signal responsive apparatus for production of images in a picture area, comprising, in combination:

a light amplifier having first and second electrodes, means for applying energizing potential between said first and second electrodes, a multiplicity of electron discharge cathodes in a mosaic pattern substantially parallel to and spaced behind said first electrode, means providing a low-pressure gaseous medium extending to said cathodes wherein electric glow discharge may occur, and anode means in said gaseous medium cooperating with said cathodes to establish a localized glow discharge transferable from cathode to cathode in a predetermined raster pattern for activating said light amplifier in the immediate region of the glow discharge and thereby causing the effective light output to correspond to a scanned picture signal.

11. Electric signal responsive apparatus as defined in claim 10, wherein said means for applying energizing potential between said first and second electrodes comprises means for applying television video signals therebetween to produce different light intensity values in different elemental areas of the screen, said apparatus further including means for causing the electric glow discharge to proceed throughout a line-by-line scanning raster in synchronism with the supplied television signals, said last named means comprising means for recurrently energizing every third cathode along a substantially horizontal line or row of cathodes in a first phase, and energizing the next adjacent cathodes in the line or row in the desired direction of the progression of the glow discharge in a second phase displaced by a predetermined phase angle from said first phase.

References Cited

UNITED STATES PATENTS

| | | | |
|---|---|---|---|
| 2,905,830 | 9/1959 | Kazan. | |
| 2,967,266 | 1/1961 | Diemer et al. | 315—169 |
| 3,041,490 | 6/1962 | Rajchman et al. | 313—108 |
| 3,179,846 | 4/1965 | Fischer | 313—108 |

RICHARD MURRAY, Primary Examiner

A. H. EDDLEMAN, Assistant Examiner

U.S. Cl. X.R.

313—108; 315—169